(12) United States Patent
Martinola et al.

(10) Patent No.: US 11,072,089 B2
(45) Date of Patent: Jul. 27, 2021

(54) METHOD FOR PRODUCING A DIMENSIONALLY STABLE CONCRETE WORKPIECE AND DIMENSIONALLY STABLE CONCRETE WORKPIECE

(71) Applicant: Synrocks SA, Lugano (CH)

(72) Inventors: Giovanni Martinola, Buchs (CH); Andrea Pedretti-Rodi, Bellinzona (CH)

(73) Assignee: Synrocks SA, Lugano (CH)

( * ) Notice: Subject to any disclaimer, the term of this patent is extended or adjusted under 35 U.S.C. 154(b) by 393 days.

(21) Appl. No.: 15/573,763

(22) PCT Filed: May 18, 2016

(86) PCT No.: PCT/IB2016/052910
§ 371 (c)(1),
(2) Date: Nov. 13, 2017

(87) PCT Pub. No.: WO2016/193848
PCT Pub. Date: Dec. 8, 2016

(65) Prior Publication Data
US 2018/0126588 A1    May 10, 2018

(30) Foreign Application Priority Data
May 18, 2015    (CH) .................................... 00681/15

(51) Int. Cl.
*B28B 1/24*    (2006.01)
*B28B 1/14*    (2006.01)
(Continued)

(52) U.S. Cl.
CPC .................. *B28B 1/24* (2013.01); *B28B 1/14* (2013.01); *B28B 7/344* (2013.01); *B28B 7/42* (2013.01); *B28B 13/0205* (2013.01)

(58) Field of Classification Search
CPC .. B28B 1/24; B28B 1/14; B28B 7/344; B28B 13/0205; B28B 7/42
See application file for complete search history.

(56) References Cited

U.S. PATENT DOCUMENTS 4,234,534 A * 11/1980 Ito ........................... B28B 7/241
264/328.8
5,779,957 A * 7/1998 Champomier .......... B28B 5/021
264/151
(Continued)

FOREIGN PATENT DOCUMENTS

WO    WO-2011/072410 A1    6/2011

OTHER PUBLICATIONS

Orij, Jack, "International Search Report", for PCT/IB2016/052910 dated Nov. 7, 2016, 6 pages.

*Primary Examiner* — Nahida Sultana
(74) *Attorney, Agent, or Firm* — Winstead PC

(57) ABSTRACT

The disclosure relates to a method for producing a dimensionally stable concrete work-piece characterised in that to produce the concrete work-piece a fully-sealed dimensionally stable form is filled with fresh concrete in a predetermined geometry, during the subsequent and undisrupted hydration a predetermined temperature distribution of the walls of the form surrounding the hydrated concrete is carried out and the concrete workpiece is shaped at a compressive strength of more than 10 MPa.

14 Claims, 7 Drawing Sheets

Figure 1:
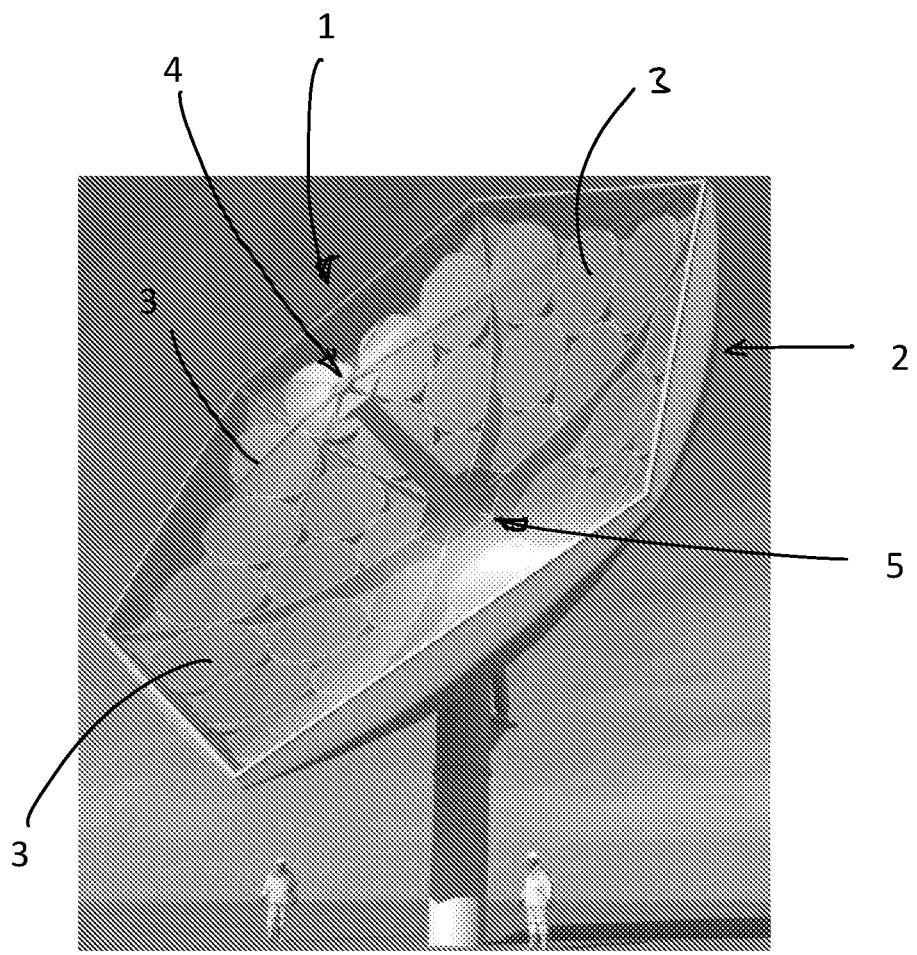

(51) Int. Cl.
  *B28B  7/42*   (2006.01)
  *B28B  7/34*   (2006.01)
  *B28B  13/02*  (2006.01)

(56) References Cited

U.S. PATENT DOCUMENTS

| | | | | |
|---|---|---|---|---|
| 5,911,941 | A  * | 6/1999 | Rokhvarger | ......... B28B 13/067 |
| | | | | 264/432 |
| 7,931,250 | B2 * | 4/2011 | Vappula | .................. B28B 7/002 |
| | | | | 249/219.1 |
| 2007/0057408 | A1 * | 3/2007 | Sandqvist | ........... B28B 13/0215 |
| | | | | 264/333 |

* cited by examiner

State of the Art

METHOD FOR PRODUCING A DIMENSIONALLY STABLE CONCRETE WORKPIECE AND DIMENSIONALLY STABLE CONCRETE WORKPIECE

The invention relates to a method for producing a dimensionally stable concrete workpiece, a vessel for casting fresh concrete into a mould, and concrete workpieces.

Concrete finds widespread use, but also has unfavourable properties, such as for example a low tensile strength, which properties are the subject of intensive further development and are often also improved in larger or smaller steps.

Generally, however, it has been accepted hitherto that concrete workpieces have little dimensional stability. It is therefore standard to provide concrete workpieces on the construction, the tolerance whereof is in the region of a millimetre per metre length (deviation of +/−0.5 mm from the nominal length). This is also the case with window sills for example, wherein any gaps are simply covered with a metal lining.

A wider-ranging use is in principle made available by the continuing improvement in the strength properties of concrete, wherein the geometry of the concrete workpieces is then also increasingly adapted to the anticipated load, i.e. is more complicated, so that the improved strength properties can be utilised. In turn, the low accuracy of the corresponding concrete workpiece is then a drawback.

Accordingly, the problem of the present invention is to provide a method for producing dimensionally stable concrete workpieces as well as dimensionally stable concrete workpieces.

As a result of the fact that, during the hydration of the fresh concrete, a predetermined temperature distribution is set in the walls of the mould, the hydration of the fresh concrete can be controlled, which on the one hand can be speeded up by heat fed to the fresh concrete and then also by the heat generated by the aforesaid itself, but can also be slowed down by the heat dissipated from the fresh concrete. The effect of this is that the volume changes caused by the hydration and thermal expansion and hydration-related micro-structural changes can be controlled, and consequently the geometrical distortions continuously generated in the hydrating concrete and the associated stresses remain below the threshold above which faults arise in the hydrating concrete, which are no longer corrected up to the completed hydration and reduce the dimensional stability and also the strength of the concrete workpiece. As a result of the fact that a fully sealed mould is completely filled with fresh concrete, the entire surface of the fresh concrete is in contact with the mould, which permits the hydration to be controlled over the entire body of the concrete workpiece. A compressive strength of 10 MPa before the formwork removal of the concrete workpiece ensures that the latter is not mechanically damaged during the removal from the formwork, so that the previously avoided faults by the mould removal do not still arise during the formwork removal. Finally, the effect of limiting the diameter of the maximum grain size is that the heat transport through the hydrating fresh concrete is not disrupted, which otherwise leads to a chaotic temperature distribution, to geometrical distortions during hydration and corresponding stresses and thus adversely affects the dimensional stability.

If such geometrical distortions can be prevented from arising during the hydration, a dimensionally stable workpiece results, which meets high demands and also is not reduced in strength. According to the invention, dimensionally stable series parts can in particular also be produced, which in a predetermined geometry each have a tolerance of only +/−25 micrometres per metre length of the workpiece.

It should be mentioned at this point that test arrangements have become known for investigating the modulus of elasticity arising in the hydrating concrete, which test arrangements keep the hydrating concrete at a constant temperature, wherein however, by a mechanical action on the concrete, its modulus of elasticity is continuously measured, which does not leave said concrete unaffected, but rather leads to geometrical distortions of the concrete. As a result of the constant temperature, the evaluation of the course of the hydration detected via the modulus of elasticity is facilitated, since the equivalence calculation for the time sequence known to the person skilled in the art is then dispensed with, because the hydration progresses at different rates due to the generated inherent heat (Claude Boulay et al: How to monitor the modulus of elasticity of concrete, automatically since the earliest age?, Materials and Structures (2014) 47:141-155).

As a result of the fact that a mould is used, the hydration can be speeded up in a controlled manner by heating the fresh concrete, which enables efficient production through a high production rate.

As a result of the fact that the vessel for casting fresh concrete is designed to change the flow rate of the exiting fresh concrete, the filling rate of the mould, into which the fresh concrete is poured, can for example be kept constant over changes in its cross-section or the cross-section can also be adapted. This thus prevents the filling rate from becoming so high in cross-sectional constrictions that for example air-filled pockets remain, which in turn prevent the contact of the temperature-controlled walls of the mould with the fresh concrete. In other words, the mould is not completely filled with fresh concrete in the case of air-filled pockets, so that, in addition to the defective contour of the workpiece, the hydration cannot be controlled at least locally, in the region of the pockets, and harmful geometrical distortions in the hydrating concrete can thus arise. Further advantageous effects of a constant or adapted filling rate, for example in the case of fibre-reinforced concrete, lie in the fact that the (usually random) alignment of the fibres desired for the strength of the concrete is not disrupted, such as may be the case when turbulence arises in cross-sectional constrictions due to an excessively high filling rate.

As a result of the fact that the concrete workpiece according to the invention has a tolerance of 50 micrometres per metre (deviation of +/−25 micrometres per metre length of the workpiece from the nominal dimension), it can be used in areas which hitherto were not able to the covered by concrete workpieces. On the one hand in terms of individual parts, but also as series parts, which are all constituted dimensionally stable and enable corresponding modes of construction. This also includes (apart from numerous other applications) the application in the area of concentrators for solar collectors, for example for producing a facet in a dish-collector, which comprises a support with a parabolic surface and a reflecting layer lying directly or indirectly on the parabolic surface, wherein the reflecting layer assumes the contour of the parabolic surface of the support. According to the invention, a focal region of 10 mrad or less can be produced, down to 1 mrad or even less, which suffices for high concentrations of sunlight.

Embodiment as a parabolic support for a reflecting layer for a solar collector, as is described below.

The invention will be described below in somewhat greater detail with the aid of the figures.

Figure 2A:
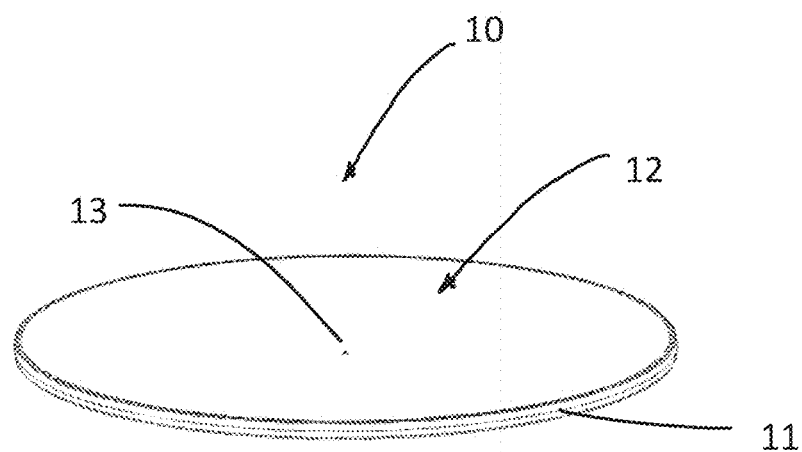
Figure 2B:
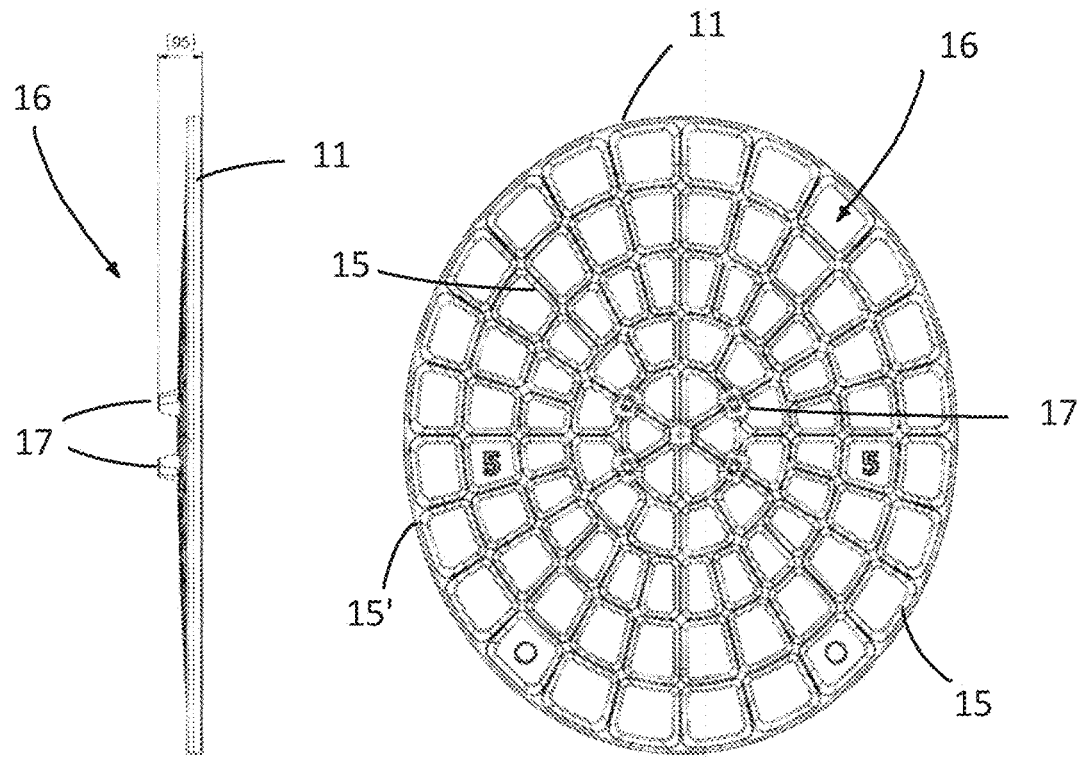
Figure 2C:
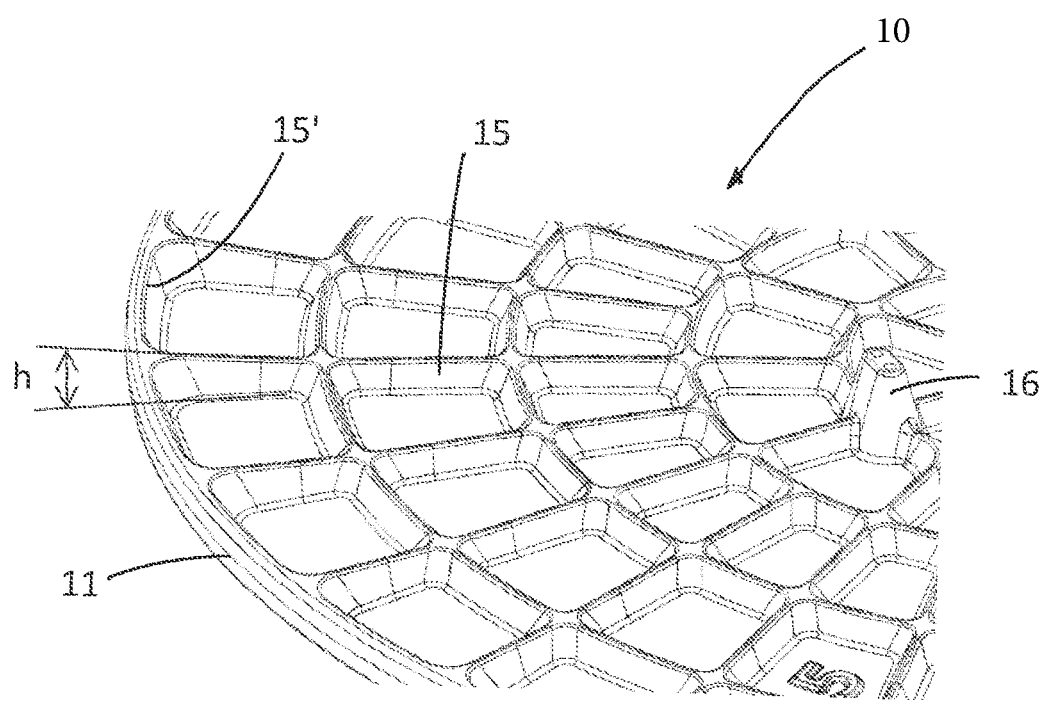
Figure 3A:
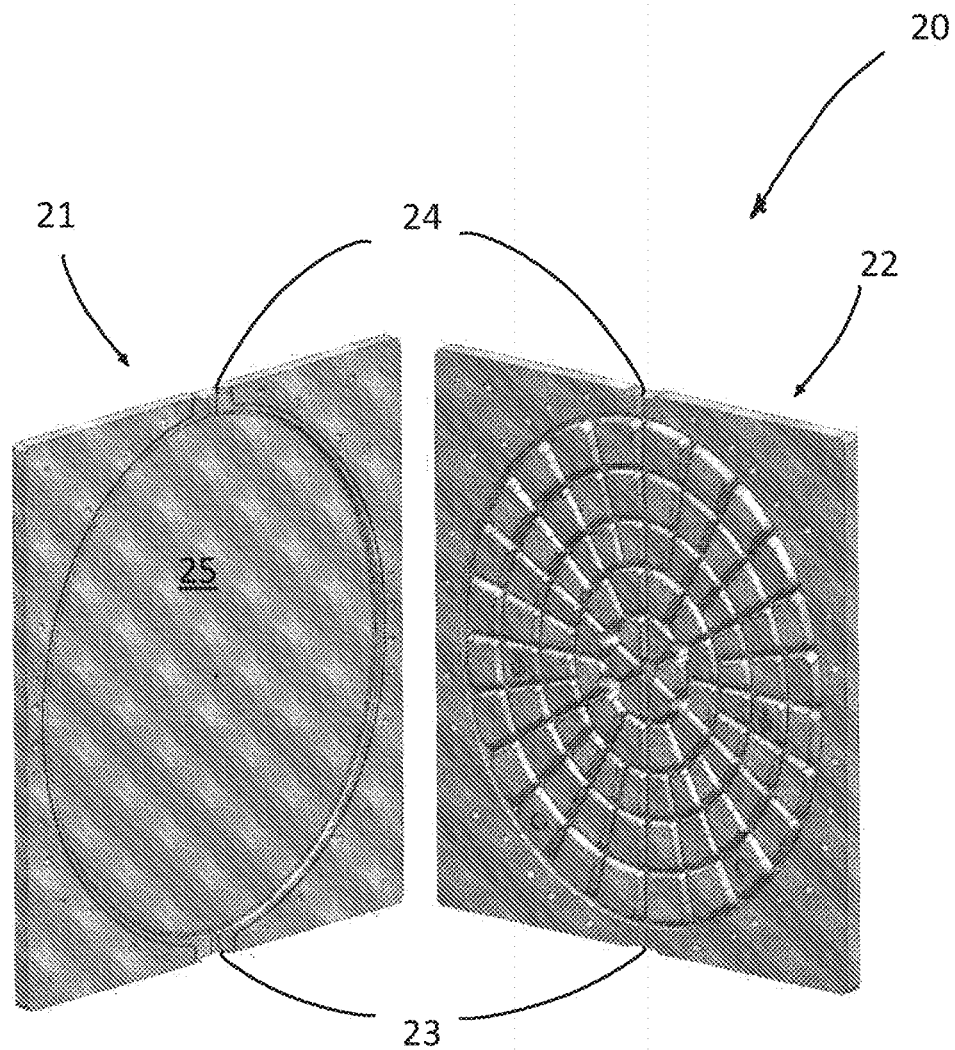
Figure 3B:
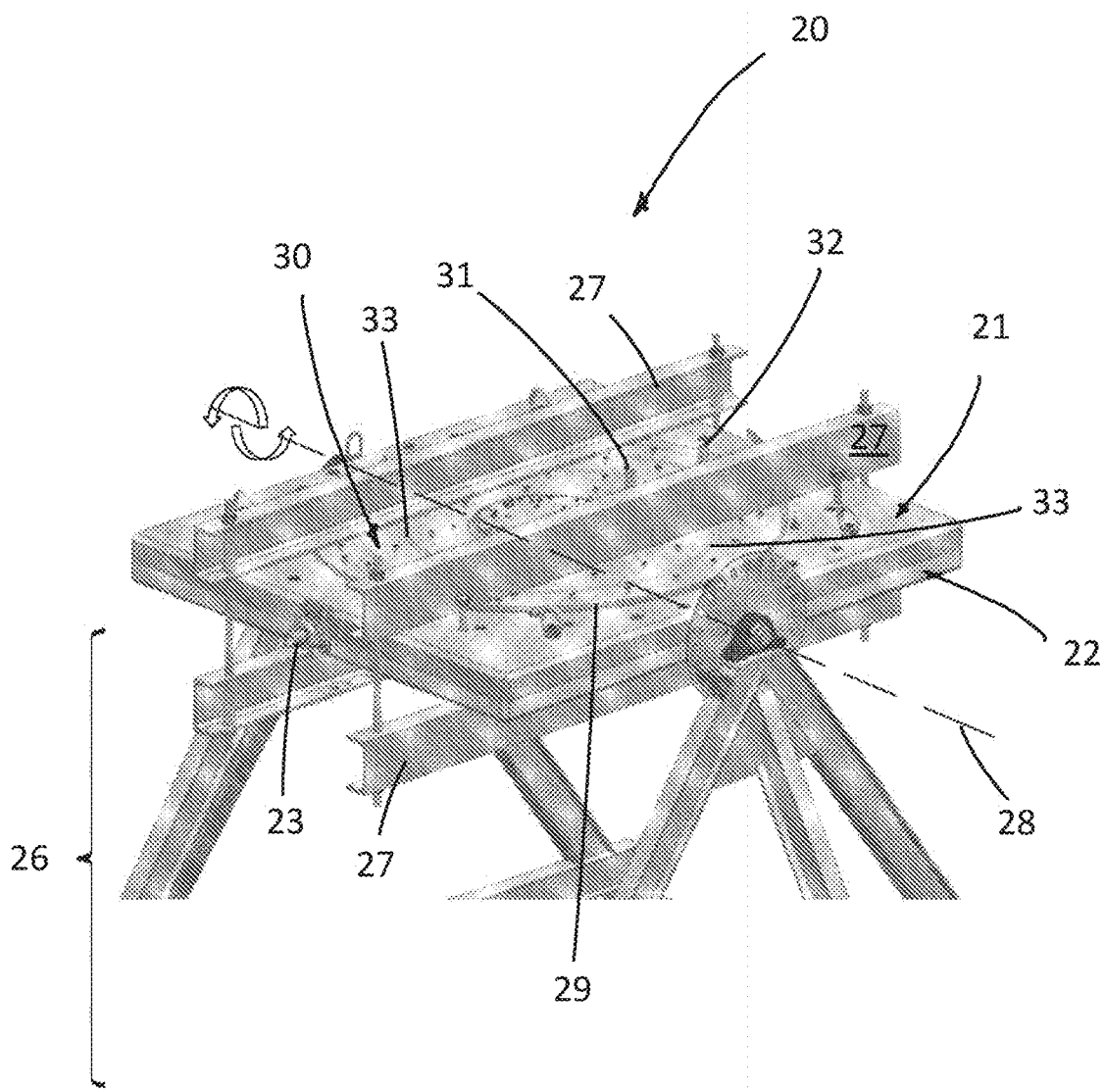
Figure 4:
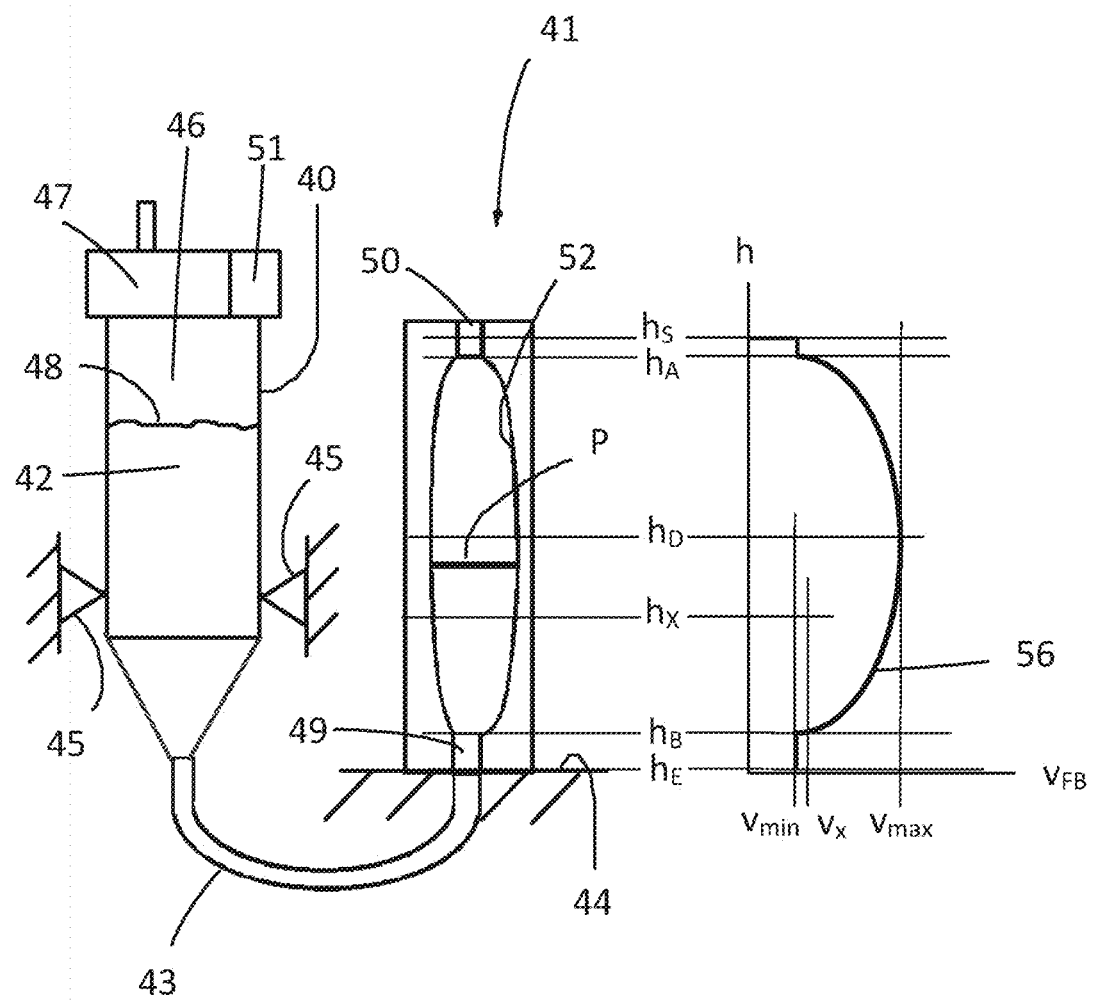

FIG. 1 shows a dish-collector according to the prior art with a number of facets, which concentrate radiation on an absorber, FIG. 2a shows an example of embodiment of a concrete support produced according to the invention for a facet of a collector in a view from above, FIG. 2b shows the concrete support from FIG. 2a from the side and from below, FIG. 2c shows, enlarged, a portion of concrete support from FIG. 2a, from beneath, FIG. 3a shows a two-part, fully sealed mould for the production of the concrete support from FIG. 2a, FIG. 3b shows the mould from FIG. 3a in the closed state in a view from above onto the cooling module arranged at the upper half of the mould, and FIG. 4 shows a vessel according to the invention for casting fresh concrete into a mould.

Figure 5C:
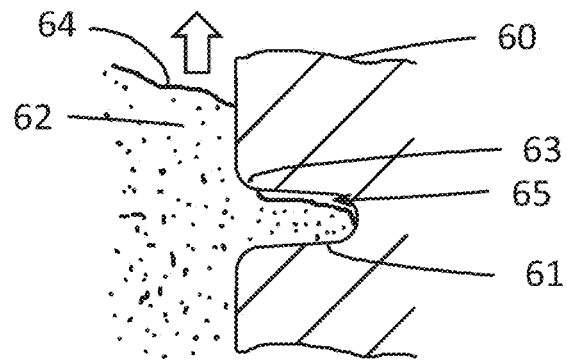
Figure 5B:
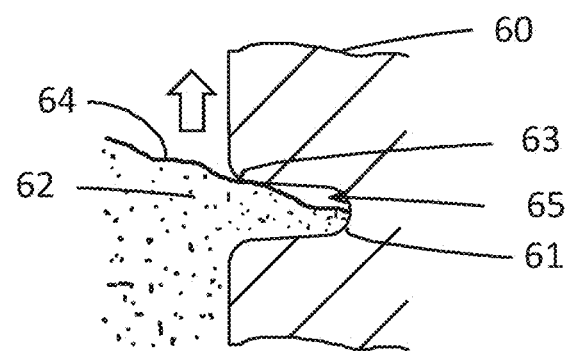
Figure 5A:
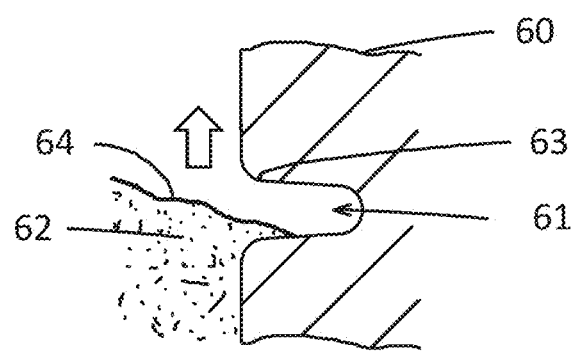

FIGS. 5a-5c show a detail from a mould with a cavity for a rib to be cast during the filling of mould with fresh concrete.

FIG. 1 shows a dish-collector 1 according to the prior art, which is constituted according to WO 2011/072410. A paraboloid concentrator 2 is composed of individual facets 3, which each reflect sunlight onto an absorber 4, which is arranged at the focal point of paraboloid concentrator 2. Thus, facets 3 themselves are not paraboloids; they form a local region of the paraboloid of concentrator 2, so that the geometry of the reflecting surface of facets 3 is different depending on their distance from vertex 5 of paraboloid concentrator 2. Such facets 3 are called parabolic here; they form in total, as mentioned, a paraboloid.

The reflecting surface of facets 3 is formed by a compression-loaded, flexible membrane vapour-coated with aluminium and arranged in an excess pressure chamber, which membrane replicates the local curvature of paraboloid 2 on account of the oval contour of facet and its compression-loading. Each facet 3 is therefore part of paraboloid concentrator 2 and therefore part of a paraboloid, at the focal point whereof absorber 4 lies. Concentrations of sunlight of over 1000, up to 3000 or more can be achieved by means of such an arrangement.

FIG. 2a shows a concrete support 10 according to the invention for a reflecting layer (omitted so as to make the figure clearer), said concrete support being constituted disc-shaped and having a periphery 11, wherein concrete support 10 and the reflecting layer form a facet for a dish-collector according to FIG. 1. Such a reflecting layer can be formed by a reflecting foil, such as PET foil vapour-coated with aluminium, or by another membrane, such as for example a thin aluminium sheet. The reflecting layer is placed directly onto parabolic surface 12 of concrete support 10 and, during operation, is pressed for example by the ambient pressure against surface 12, since the intermediate space between surface 11 and the reflecting layer is evacuated via an underpressure channel 13. In a specific embodiment, the main axis of oval concrete support 10 measures 1379 mm, the secondary axis 1196 mm, the location of absorber 4 (FIG. 1) being located at a distance of several metres from the mouth of underpressure channel 11.

It emerges that parabolic surface 12 has a high degree of precision, i.e. small tolerances, otherwise the concentrations required above would not be reached.

FIG. 2b shows concrete support 10 from FIG. 2a on the one hand from the side and then from beneath, wherein the filigree rib structure with ribs 15 of underside 16 can be seen in the view from beneath, and also support stud 17 for the arrangement of concrete support 10 in a frame of a dish-collector. Periphery 11 is formed by the outer side of a circumferential rib 15'.

FIG. 2c shows, enlarged, a portion of concrete support 10, once again from beneath, to illustrate the rib structure and the associated tolerances of the dimensions, in particular the dimensions of surface 12 (FIG. 2a).

The dimensional tolerances of the concrete support produced by the method according to the invention amount, as mentioned, to 0.05 mm per m, which with a height h of ribs 15 at the outer side of concrete support 10 of, in this case, 40 mm makes a deviation of surface 11 from its nominal dimension of only +/−0.001 mm. In other words, it is the case that concrete support 10, after its removal from the formwork, has a highly precise surface 12 without post-processing, the accuracy whereof enables a geometric focal spot for the reflected radiation of down to 1 mrad. "Geometrical focal spot" because concrete surface 12 itself is insufficiently reflecting and therefore has to be covered with a reflecting layer, see description above. Surface 12, however, endows the reflecting layer with its contour—so that the reflecting layer during operation achieves a focal spot which essentially corresponds to the geometrical focal spot of surface 12 with a diameter of down to only 1 mrad.

The result is a simple, robust and cost-effective design and production for a component which is complex on account of the difficult parabolic shape, which in the prior art can be produced only with difficulty and at comparatively high cost.

Concrete support 10 shown in FIGS. 2a to 2c is only an example of a concrete workpiece that can be produced by the method according to the invention. A further (among many) example of embodiment is concrete foundations for machine tools or machining centres, which operate with a high degree of precision in the micrometre range, wherein considerable forces act on the tool and/or the workpiece depending on the machining; in addition, the workpieces themselves can reach a weight of several tonnes. Stable foundations with a highly precise surface are required here, since the machine frames must be erected with a precision in the micrometre range, so that the required accuracy in the machining of the workpieces can be achieved.

FIG. 3a shows a mould 20 for performing the method according to the invention, which comprises an upper half 21 for the formation of surface 12 (for supporting the reflecting layer, see FIG. 2a) and a lower half 22 for the rib structure (see FIG. 2b). Wall surface for the formation of surface 12 of concrete workpiece 10 (FIG. 2a) is dimensionally stable, i.e. has a tolerance which is equal to or preferably less than the tolerance that can be achieved in finished concrete support 10 by the method according to the invention. The wall surfaces of lower half 22 for the formation of the rib structure (FIG. 2b,c) can have a greater tolerance, since the dimensional stability of ribs 15 as such is not of concern for the intended use of concrete support 10. In other words, it is the case that mould 20 is dimensionally stable in a predetermined geometry, and according to the invention may or may not also be dimensionally stable in the other regions.

A supply channel 23 for the fresh concrete and an outlet channel 24 for the air escaping during the casting and for the fresh concrete exiting at the end after the complete filling of the mould can be seen. Mould 20 is fully sealed, i.e. the concrete workpiece to be cast is enclosed on all sides; it whole surface is in contact with the walls of the mould, with no entry of ambient air.

FIG. 3b shows closed mould 20 ready for operation, which is mounted on a metal frame 26, the lower part whereof standing on the ground is however omitted so as to make the figure clearer. The two mould halves 21, 22 are clamped between metal supports 27; mould 20 is sealed. The dashed line marks a rotational axis 28, about which the mould can be tilted, so that it can be tilted out of the horizontal position shown into a vertical position.

Upper mould half 21 comprises an annular recess 29, into which an annular temperature module 30 formed in the opposite direction is inserted, which in the embodiment shown extends essentially over the dimensions of concrete support 10 to be cast (FIGS. 2a to 2c) and comprises an inlet 31 and an outlet 32 for a heat transfer medium, in this case water. Inlet and outlet 32 are connected via a heat exchange channel 33 laid in an annular form in temperature module 30, so that, by means of water circulating in heat exchange channel 33, the upper mould half can be set at a predetermined temperature at least in the region of concrete support 10 to be cast, whether this is along a temperature profile or whether it is at a predetermined constant temperature. Temperature module 30 is shown transparent to the extent that the course of heat exchange channel 33 can be seen.

It cannot be seen in the figure that lower mould half is of course also provided with a temperature module, which in its design corresponds to temperature module 30, so that both mould halves 21, 22 can be heated or cooled in like manner by circulating water.

To make the figure clearer, a cooling and/or heating unit connected to inlet 31 and outlet 32 for the circulating heat exchange medium is omitted. The latter can be constituted conventionally and is designed by the person skilled in the art corresponding to the specific case. In the case of a heating element, therefore, mould 20 comprises a heating arrangement for the contact surfaces of the fresh concrete cast therein, which is preferably constituted as a liquid heating system, particularly preferably as a water heating system.

It emerges that mould 20 can be cooled and also heated via temperature module 30, depending on the temperature of the circulating heat exchange medium, temperature module 30 therefore also being able to act as a heating arrangement.

Mould 20 is preferably made of aluminium, but particularly preferably can be made from an aluminium-silicon alloy, which has essentially the same thermal expansion coefficient $\alpha_T$ as the concrete being cast in it. A temperature profile can then be set for the hydration of the concrete, without heat-induced volume differences arising between the concrete and the mould, which affects the contact of the concrete with the walls of the mould in an undesirable manner in any phase of the hydration.

Since thermal expansion coefficient $\alpha_T$ of the concrete to be cast changes depending on its given composition, the person skilled in the art can determine coefficients $\alpha_T$ of the concrete and the mould in the specific case. A frequent range for $\alpha_T$ for fresh concrete lies between $6\times10^{-6}$/K and $20\times10^{-6}$/K, preferably between $6\times10^{-6}$/K and $18\times10^{-6}$/K, particularly preferably for fibre-reinforced concretes between $6\times10^{-6}$/K and $14\times10^{-6}$/K. According to the invention, a mould for the hydration of fresh concrete cast into it should accordingly be provided with a thermal expansion coefficient $\alpha_T$ in the aforementioned ranges.

FIG. 4 shows a vessel 40 according to the invention for casting fresh concrete into a mould 41, for the production of an object which is lens-shaped in cross-section in the embodiment shown. Mould 41 changes its cross-section correspondingly, is preferably similarly constructed to mould 20 (FIGS. 3a and 3b), and is brought here into a vertical position, in which it is filled with fresh concrete 42 via a delivery channel of vessel 40 constituted here as line 43. Mould 41 is mounted by means of a symbolically represented support 44 in a similar manner to mould 20 (FIG. 3b). Vessel 41 contains at least one batch of fresh concrete 42, i.e. as much as is required to completely fill mould 41. In order to make the figure clearer, a temperature module 30 (FIG. 3b) or a similar arrangement for controlling the temperature is omitted.

Vessel 40 is mounted on symbolically represented supports 45 and comprises an excess pressure zone 46, in which a pressure can be exerted on surface 48 of fresh concrete 42 preferably by means of air pressure, generated by a compressor 47, as a result of which fresh concrete 42 is injected through line 43 via its inlet 49 into mould 41, wherein the air contained in mould 41 and displaced by fresh concrete 42 continuously escapes through outlet 50.

According to the invention, compressor 47 is also provided with a programmable control 51, by means of which the air pressure in excess pressure zone 47 can be continuously changed in a predetermined manner, with the result that the volume flow of the fresh concrete flowing through line 43 also changes in a predetermined manner. According to the invention, this permits filling rate $v_F$ (i.e. the rate at which level P of the fresh concrete in mould 41 rises upwards) to be adapted to its cross-sectional changes, or more precisely to those of hollow space 52 to be filled. Filling rate $v_F$ is preferably kept constant over the cross-sectional changes of mould 41.

To sum up, a vessel is constituted according to the invention such that, during the delivery of a batch of fresh concrete, the volume flow thereof is changed in a predetermined manner, wherein it preferably comprises a fresh concrete container connected to a delivery channel and an arrangement for generating an excess pressure in the fresh concrete container, preferably by means of air, and wherein the arrangement is constituted to continuously change the excess pressure during the delivery of a batch of fresh concrete, in such a way that the volume flow of the delivered concrete changes corresponding to a current setpoint value. For the determination of the current setpoint value for the volume flow, see below in respect of FIGS. 5a to 5c.

Diagram 55 shown in the figure at the side of mould 41 shows on the vertical axis height h of mould 41 and on the horizontal axis flow rate $v_{FB}$ of fresh concrete 42 flowing through line 43. Curve 56 shows qualitatively flow rate $v_{FB}$ in the case of a constant filling rate $v_F$.

It can be seen that, with a level P of fresh concrete 42 still in inlet 47 (height $h_E$), flow rate $v_{FB}$ is at a minimum and has a value $v_{min}$. If level P has reached hollow space 52, i.e. the cross-section of the mould widens, flow rate $v_{FB}$ must continually increase in order that filling rate $v_F$ remains constant (has a general value $v_x$ at height $h_x$), wherein maximum value $v_{max}$ is reached at height $h_D$ (the maximum cross-sectional width of mould 41).

Flow rate $v_{FB}$ then continuously drops corresponding to the diminishing cross-section, until it again reaches minimum value $v_{min}$ at outlet 48 (height $h_A$), at which a part of outlet 48 is filled further in order to ensure that mould 41 is completely filled. Then (at height $h_S$), flow rate $v_{FB}$ is stopped, since the batch of concrete is filled into mould 41.

According to the invention, the vessel is thus constituted such that, during the delivery of a batch of fresh concrete, it changes the volume flow thereof in a predetermined manner, wherein with the aid of such a vessel the fresh concrete is preferably injected into the mould at a varying flow rate $v_{FB}$, in such a way that the mould is filled at a predetermined, preferably essentially constant flow rate $v_{FB}$ over the cross-sectional changes in the mould, wherein the injection of the fresh concrete also preferably takes place by means of an excess pressure and the flow rate is controlled by a change in the excess pressure.

The rib structure of lower mould half 22 can be seen in FIG. 3a. If level P of fresh concrete injected into vertically orientated mould 20 rises upwards from inlet 23 to outlet 24, the cross-section of mould 20 changes continuously, which for a constant filling rate $v_F$ requires a continuous adaptation of flow rate $v_{FB}$. The hollow space of mould 20 can be split up into horizontal cross-sections and filling rate $v_F$ can be determined depending on the area of the cross-sections. If for example 500 or 1000 cross-sections are provided, a finely graduated change in the cross-section and therefore flow rate $v_{FB}$ results. Control 51 (FIG. 4) can thus be programmed accordingly and the pressure in excess pressure zone 46 can be controlled by means of a PID controller, in such a way that real flow rate $v_{FB}$ leads to an essentially constant real filling rate $v_F$ of mould 20. On the basis of the hollow space of the mould to be used, the person skilled in the art is easily able in the specific case to establish the number of cross-sections and the appropriate control model.

FIGS. 5a to 5c show a detail from a mould 60 with a cavity 61 for a rib to be cast during the filling of mould 60 with fresh concrete 62. Cavity 61 is bordered at its upper end by a rounded edge 63. Surface 64 of fresh concrete 62 rises upwards in the direction of the arrow, and tapers off towards the wall of mould 60 on account of the comparatively high viscosity of the fresh concrete.

FIG. 5a shows the moment at which the level of fresh concrete 62 has reached the location of cavity 61 and fresh concrete 62 is penetrating into the latter. With an increasing level, and with an excessively high filling rate, the situation according to FIG. 5b results, in which surface 64 touches rounded edge 63 of the mould and thus encloses an air bubble 65 at the rear end of cavity 61. FIG. 5c shows the situation somewhat later. Air bubble 65 is somewhat compressed, but definitely prevents cavity 61 from being completely filled with fresh concrete 62.

The result is that, with an excessively high filling rate, the one side of the rib of the concrete workpiece to be cast cannot lie adjacent to the wall of mould 60 for the hydration, which leads to a fault in the workpiece relating to its geometry and relating to its dimensional stability. If the level of the concrete rises slowly enough such that cavity 61 can be completely filled with fresh concrete 62 before its surface 64 seals the latter in contact with rounded edge 63, the casting fault does not arise. The effect of this is that, in connection with the geometrical structure of the mould, a maximum permissible filling rate $v_F$ results. Depending on this geometrical structure, maximum filling rate $v_F$ is the same or is different for different regions of the mould. The person skilled in the art can easily determined the rate profile of filling rate $v_F$ (constant or variable in a predetermined manner) on the basis of a specific mould and the fresh concrete to be cast. It is advantageous in the adaptation of filling rate $v_F$ that the mould can thus be filled at the maximum possible rate with due regard to a specific concrete mixture, which assists an efficient production process.

According to the invention, a dimensionally stable concrete workpiece such as for example a concrete support 10 (FIGS. 2a to 2c) for a reflecting layer is produced
by the fact that a fully sealed mould, dimensionally stable in a predetermined geometry, is completely filled with fresh concrete, for example mould 20 or 41 according to FIG. 3b or 4. The fresh concrete can for example be a conventional fibre-reinforced concrete, such as is selected by the person skilled in the art depending on the intended purpose. The fully sealed mould ensures, as mentioned above, that the fresh concrete is temperature-controlled over its entire surface and no moisture exchange with the surroundings can take place, which disrupts the desired controlled hydration.

During the subsequent and undisrupted hydration, a predetermined temperature distribution of the walls of the mould surrounding the hydrating concrete is carried out. A predetermined temperature distribution inside the hydrating concrete body thus ensues, as a result of which lasting geometrical distortions are avoided, and apart from this temperature control other geometrical distortions, for example distortions caused mechanically, are also avoided by the undisrupted hydration.

Finally, the concrete workpiece is removed from the mould with a compressive strength of more than 10 MPa, i.e. with a compressive strength for sufficient stability during the formwork removal carried out carefully by the person skilled in the art, as a result of which geometrical distortions are in turn avoided.

The maximum grain size of the fresh concrete has a diameter of less than 20% of the smallest dimension of the mould. The thermal conductivity of the grain present in the concrete differs from that of the cement, so that zones with heterogeneous heat distribution arise in the region of additives, which can disrupt the desired predetermined temperature distribution in the hydrating concrete workpiece. This effect depends on the local dimensions of the concrete workpiece to be produced: tests carried out by the applicant have shown that undesired geometrical distortions reducing the dimensional stability of the concrete workpiece are absent during the hydration if the diameter of the maximum grain size does not reach 20% of the smallest dimension of the mould.

The temperature distribution of the walls of the mould is preferably set such that the temperature distribution in the hydrating concrete from the start of the hydration up to the formwork removal lies within a permitted range of 15° C., preferably 10° C., particularly preferably 5° C. In principle, a temperature gradient in the concrete cannot be avoided with a temperature control of the hydrating concrete by means of the walls of the mould. By means of a test with a specific concrete mixture, the person skilled in the art can easily establish what temperature gradient is currently permissible or not. Tests carried out by the applicant have shown that a dimensional accuracy of +/−25 micrometres per metre of a dimension of the concrete workpiece can be readily achieved if the highest and lowest temperature in the hydrating concrete as a point in time do not lie more than 5° C. apart from one another, i.e. the temperature distribution in the concrete remains within a permitted range of 5° C. For a lower dimensional accuracy of +/−50 micrometres per metre, a temperature range of 10° C. or 15° C. may be sufficient depending on the concrete mixture used, which can easily be established by the person skilled in the art with simple tests.

According to the invention, the hydrating concrete workpiece can pass along a temperature profile for rapid production of the concrete workpieces, i.e. its temperature can be increased for example to speed up the hydration. This temperature profile is of course produced by the temperature of the contact surfaces of the walls of the mould with the concrete. The aforementioned permitted temperature ranges are preferably complied with during the passage through the temperature profile. With a view to efficient production, the increase in the temperature in the concrete is particularly preferably carried out in such a way that the concrete is heated as quickly as possible, but its temperature distribution always remains in the permitted range of 5° C., 10° C. or 15° C. Here too, it can easily be determined by tests what the quickest possible heating is in the case of a specific concrete mixture, for example by the fact that the mould is provided with thermal sensors for the test, around which the concrete is cast.

For the production of concrete supports 10 (FIGS. 2a to 2c), for example, the temperature profile can provide for an increase in the temperature in the concrete within 2 hours from 25° C. to 45° C., then for this temperature to be held and finally for a reduction in the temperature within 3 hours from 45° C. back again to 25° C.

The person skilled in the art can of course provide a shrinkage-compensated concrete mixture; additives compensating for shrinkage are known in the prior art. This thus prevents geometrical distortions that cannot be removed from arising in the dimensionally stable mould due to shrinkage during the hydration. On the other hand, it is also provided according to the invention to adapt the thermal expansion to the shrinkage in a temperature profile: the temperature profile then provides for an increase in the temperature of the hydrating concrete, in such a way that its thermal expansion essentially compensates for the shrinkage. This is accompanied by the fact that the mould has a lower thermal expansion coefficient $\alpha_T$ than the concrete, and that the workpiece is then removed from the formwork at a high temperature and cools down in the open so as to prevent geometrical distortions on account of the thermal shrinkage. In the specific case, the person skilled in the art can adapt the material and geometry of the mould, the concrete mixture and the temperature profile to one another.

Irrespective of the smallest dimension of the mould, a maximum grain size with a diameter of less than 1 mm, particularly preferably less than 0.5 mm is preferably used, in order to achieve flawless dimensional stability irrespective of the concrete mixture used, in particular with the temperature profiles passed through during the hydration.

Instead of a mould according to FIGS. 3 and 4 with a temperature module (or another suitable cooling or heating arrangement), a mould can also be used according to the invention, the mass whereof amounts to more than three times, preferably more than four times, particularly preferably more than five times the mass of the fresh concrete present in it after complete filling. The mould is thus able to absorb the heat of the hydrating concrete, without it having to be actively cooled itself during the hydration, and it can be produced and operated in a correspondingly straightforward and favourable manner.

The method according to the invention will be described briefly using the example of a concrete support 10 (FIGS. 2a to 2c):

After the preparatory cleaning, a mould 20 is heated to 25° C., the fresh concrete at the same time being prepared by mixing its components. The viscous mass of the fresh concrete contains air bubbles due to the mixing process, which are preferably removed from the concrete in an underpressure chamber; the residual pressure remaining in the underpressure chamber preferably amounts to 150 mbar, particularly preferably 50 mbar. Here too, the person skilled in the art can establish the duration of the underpressure treatment for the specific concrete mixture. Air bubbles cause inhomogeneities in the temperature distribution of the hydrating concrete mixture and hinder the desired homogeneous micro-structure transformation, for which reason a bubble-free concrete mixture is prepared for flawless dimensional stability of the concrete workpiece.

The bubble-reduced or bubble-free concrete mixture is then injected into the mould, which in the case of a geometry such as that of mould 20 is brought for this purpose into the vertical position, which facilitates flawless filling. After complete filling of the mould, the latter is preferably brought back into the horizontal position, wherein upper half 21 (FIG. 3a) lies however at the bottom, so that dimensionally stable surface 25 (FIG. 3a) is acted upon, as a result of the inherent weight of the concrete, particularly well by the latter and the probability of any defects at surface 12 of the concrete support (FIG. 2a) is thus again reduced.

After 24 hours hydration time, the concrete support is removed from the formwork and the dead heads caused by the complete filling of the mould, which originate from supply channel 23 and outlet channel 24 (FIG. 3a), are removed mechanically. Finally, immersion in water at 90° C. for 72 hours follows for the complete hydration.

To sum up, a concrete workpiece is produced according to the invention, with a concave surface which geometrically produces a focal region of 10 mrad or less, preferably 4 mrad or less, very preferably 1 mrad or less, wherein the surface is also preferably curved in a concave manner in two dimensions. In other words, it is the case that, of course, not only two-dimensionally curved surfaces can be produced with the accuracy achievable according to the present invention—for any conceivable purpose.

If a concrete workpiece according to the invention is produced with nominal dimensions, the actual dimensions, according to the invention, lie within a tolerance of $+/-50 \times 10^{-6}$, preferably $+/-25 \times 10^{-6}$ m per m of the dimension of the workpiece.

If concrete workpieces are produced in series according to the invention, the latter are constituted with an identical shape, wherein in each case identical geometrical dimensions lie within a tolerance of $+/-50 \times 10^{-6}$, preferably $+/-25 \times 10^{-6}$ m per m of the dimension of the workpiece.

The invention claimed is:

1. A method for producing a dimensionally stable concrete workpiece, the method comprising:
    for the production of the concrete workpiece, a fully sealed mould, dimensionally stable in a predetermined geometry, is completely filled with fresh concrete, a predetermined temperature distribution of the walls of the mould surrounding the hydrating concrete is set during the subsequent and undisrupted hydration and the concrete workpiece is removed from the mould with a compressive strength of more than 10 MPa, wherein the maximum grain size of the fresh concrete has a diameter of less than 20% of the smallest dimension of the mould; and
    wherein the temperature distribution of the walls of the mould is set such that the temperature distribution in the hydrating concrete from the start of the hydration up to the formwork removal lies within a permitted range of 15° C.

2. The method according to claim 1, wherein the temperature distribution of the walls of the mould is set such that the temperature distribution in the hydrating concrete from the start of the hydration up to the formwork removal lies within a permitted range of 10 C.

3. The method according to claim 2, wherein the temperature profile includes an increase in the temperature of the concrete, such that the concrete is heated as quickly as possible, but this temperature distribution always remains in the permitted range.

4. The method according to claim 2, wherein the temperature profile provides for an increase in the temperature in the concrete within 2 hours from 25° C. to 45° C., then for this temperature to be held and finally for a reduction in the temperature within 3 hours from 45° C. back again to 25° C.

5. The method according to claim 1, wherein the temperature profile provides for an increase in the temperature of the hydrating concrete, such that a thermal expansion of the hydrating concrete essentially compensates for the shrinkage.

6. The method according to claim 1, wherein the maximum grain size has a diameter of less than 1 mm+/−3.

7. The method according to claim 1, wherein the mould has essentially the same thermal expansion coefficient $\alpha_T$ as the concrete being cast into the mould.

8. The method according to claim 1, wherein the fresh concrete is put under an underpressure before the casting into the mould.

9. The method according to claim 1, wherein the fresh concrete is injected into the mould at a varying flow rate $v_{FB}$, in such a way that the mould is filled at a predetermined, essentially constant filling rate $v_F$ over cross-sectional changes in the mould.

10. The method according to claim 1, wherein the temperature distribution of the walls of the mould is set such that the temperature distribution in the hydrating concrete from the start of the hydration up to the formwork removal lies within a permitted range of 5 C.

11. The method according to claim 1, wherein the maximum grain size has a diameter of less than 0.5 mm+/−3%.

12. The method according to claim 1, wherein the fresh concrete is put under an underpressure before the casting into the mould which amounts to 150 mbar.

13. The method according to claim 1, wherein the fresh concrete is put under an underpressure before the casting into the mould which amounts to 50 mbar.

14. The method according to claim 1, wherein the fresh concrete is injected into the mould at a varying flow rate $v_{FB}$, in such a way that the mould is filled at a predetermined, essentially constant filling rate $v_F$ over cross-sectional changes in the mould, wherein the injection of the fresh concrete also takes place by means of an excess pressure and flow rate $v_{FB}$ is controlled by a change in the excess pressure.

* * * * *